US012686445B2

(12) United States Patent
Gokulnath et al.

(10) Patent No.: US 12,686,445 B2
(45) Date of Patent: Jul. 21, 2026

(54) AIR DEFLECTOR ASSEMBLY FOR A MOTOR VEHICLE

(71) Applicant: Volvo Truck Corporation, Gothenburg (SE)

(72) Inventors: V Sri Gokulnath, Tamil Nadu (IN); Gangaram Baliram Eakmbe, Maharashtra (IN); Prakash Y, Bangalore (IN)

(73) Assignee: Volvo Truck Corporation, Gothenburg (SE)

( * ) Notice: Subject to any disclaimer, the term of this patent is extended or adjusted under 35 U.S.C. 154(b) by 352 days.

(21) Appl. No.: 18/498,699

(22) Filed: Oct. 31, 2023

(65) Prior Publication Data

US 2024/0182123 A1     Jun. 6, 2024

(30) Foreign Application Priority Data

Dec. 1, 2022     (EP) ..................................... 22210784

(51) Int. Cl.
B62D 35/00          (2006.01)

(52) U.S. Cl.
CPC .......... B62D 35/001 (2013.01); B62D 35/005 (2013.01)

(58) Field of Classification Search
CPC .... B62D 35/001; B62D 35/00; B62D 35/005; B62D 37/02; B62D 35/002
USPC ................................ 296/180.1, 180.2, 180.3
See application file for complete search history.

(56) References Cited

U.S. PATENT DOCUMENTS

| | | | | |
|---|---|---|---|---|
| 4,102,548 A | * | 7/1978 | Kangas | B62D 35/001 |
| | | | | 296/180.3 |
| 4,290,639 A | * | 9/1981 | Herpel | B62D 35/001 |
| | | | | 296/180.3 |

FOREIGN PATENT DOCUMENTS

| | | | | |
|---|---|---|---|---|
| DE | 3622663 A1 | 1/1988 | | |
| DE | 102005047190 B4 | 1/2010 | | |
| DE | 102010027717 A1 | 3/2011 | | |
| GB | 2529675 A | 3/2016 | | |
| GB | 2534422 A | * 7/2016 | .......... | B62D 35/005 |
| GB | 2579168 A | 6/2020 | | |
| WO | 2014133424 A1 | 9/2014 | | |

OTHER PUBLICATIONS

English translation of DE3622663A1; https://translationportal.epo.org; Dec. 2, 2025 (Year: 2025).*
Extended European Search Report for European Patent Application No. 22210784.9, mailed May 23, 2023, 8 pages.

* cited by examiner

*Primary Examiner* — Roger L Pang
(74) *Attorney, Agent, or Firm* — Withrow & Terranova, PLLC

(57)          ABSTRACT

An air deflector assembly for a motor vehicle, comprising a support frame having a fixed part and a movable part, the movable part being hingedly connected to the fixed part, a positioning device permitting to the movable part to be moved between a retracted position and a selected one of several inclined positions, and a deflector panel supported by the support frame, wherein the deflector panel is deformable such that its profile changes when the movable part moves from its retracted position to its selected inclined position.

10 Claims, 4 Drawing Sheets

AIR DEFLECTOR ASSEMBLY FOR A MOTOR VEHICLE

RELATED APPLICATIONS

The present application claims priority to European Patent Application No. 22210784.9, filed on Dec. 1, 2022, and entitled "AIR DEFLECTOR ASSEMBLY FOR A MOTOR VEHICLE," which is incorporated herein by reference in its entirety.

TECHNICAL FIELD

The disclosure relates generally to an air deflector assembly for a motor vehicle.

The disclosure can be applied in vehicles including a cab and carrying a load or towing a trailer, in particular in heavy-duty vehicles, such as trucks, buses, and construction equipment. Although the disclosure may be described with respect to a particular vehicle, the disclosure is not restricted to any particular vehicle.

BACKGROUND

Air resistance of a vehicle, particularly of a truck or a truck-trailer combination, is one of the important factors influencing fuel consumption of the vehicle, when driving at highway speed. Especially, trucks or truck-trailer combinations, where height and/or width of the driver's cab and the storage compartment or trailer differ, show a large air resistance during driving.

A common measure to reduce the air resistance of a truck or truck-trailer combination is to use air deflectors, which hide the frontal face area of the trailer from an oncoming air flow to get a more streamlined complete vehicle. Usually, there is at least one roof air deflector mounted to the roof of the driver's cab, which levels out the height difference between tractor and trailer and guides air over the vehicle.

The air deflector preferably has an aerodynamic design which leads the wind over the top of and along the sides of the said part of the trailer.

A truck is often adapted to pull trailers of different sizes and shapes. It must therefore be possible for the air deflector to be adjusted and adapted to the trailer so as to ensure as low as possible an air resistance for a specific trailer.

The current air deflectors are generally hinged to the truck cab with rotating hinge at front and supported with manual height adjustable mechanism at the rear. Thus, the adjustment of the angular position of such air deflectors leads to a rotation of the entire deflector about the hinge axis. This rotation can only be executed if sufficient clearance exists between the cab roof and the deflector. However, those clearances let the air to get in and cause aerodynamic drag. Furthermore, the hinge has to be big and heavy enough to withstand the deflector load at its various angular positions. This leads to an increase in the weight of the deflector, which has a negative impact on fuel consumption. Another disadvantage of this type of adjustment mechanism is the need for the driver to physically go at the rear of the cab each time the angular position of the deflector needs to be adjusted.

SUMMARY

An object of the invention is to provide an air deflector assembly that alleviate the mentioned drawbacks of the current air deflectors.

According to a first aspect of the invention, the object is achieved by an air deflector assembly for a motor vehicle, comprising:

a support frame having a fixed part and a movable part, the movable part being hingedly connected to the fixed part, a positioning device permitting to the movable part to be moved between a retracted position and a selected one of several inclined positions, a deflector panel supported by the support frame, the deflector panel being deformable such that its profile changes when the movable part moves from its retracted position to its selected inclined position.

Thus configured, the air deflector assembly of the present invention permits to keep constant the distant between the cab roof of the motor vehicle and the portion of the deflector panel that is supported by the fixed part of the support frame whatever the position of the movable part of the support frame. This distant will be the lowest possible so as to avoid the air to get in the clearance between the cab roof and the deflector panel (which is approximately zero clearance) and cause aerodynamic drag.

Thus configured, the air deflector assembly of the present invention also permits to avoid the use of a big and heavy hinge to adjust the position of the deflector panel.

According to an embodiment, the deflector panel comprises a front portion that is supported by the fixed part of the support frame and a rear portion that is supported by the movable part of the support frame.

According to a further embodiment, the positioning device consists in a linear actuator that is adapted to move the movable part of the support frame relative to the fixed part thereof.

According to a further embodiment, the fixed part, respectively the movable part, of the support frame comprises a left panel and a right panel, said left and right panels extending in a vertical direction and being distant from each other along a lateral direction.

According to a further embodiment, the left panel of the movable part, respectively the right panel of the movable part, is pivotally connected to a left connecting element, respectively to a right connecting element.

According to a further embodiment, the left connecting element, respectively the right connecting element, comprises a pair of cylindrical pins, respectively a front pin about which is connected the left panel, respectively the right panel, of the fixed part and a rear pin about which is pivotally connected the left panel, respectively the right panel, of the movable part.

According to a further embodiment, the left and right panels of the fixed and movable parts are each provided with a through-hole that is adapted to receive one the front and right pins of the left and right connecting elements.

According to a further embodiment, the deflector panel comprises a left side, respectively a right side, which is slidably connected to the left panels, respectively the right panels, of the fixed and movable parts.

According to a further embodiment, the left side, respectively the right side, of the deflector panel is provided with a groove that is adapted to slidably receive inversed L-shaped rail elements projecting from an upper end of the left panels, respectively the right panels, of the fixed and movable parts respectively. This arrangement reduces gap between side movable and fixed parts and provide extra aerodynamic benefit, which is not possible with conventional deflectors.

According to a second aspect of the invention, the object is achieved by a vehicle comprising the air deflector assembly as previously defined.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION

Figure 1:
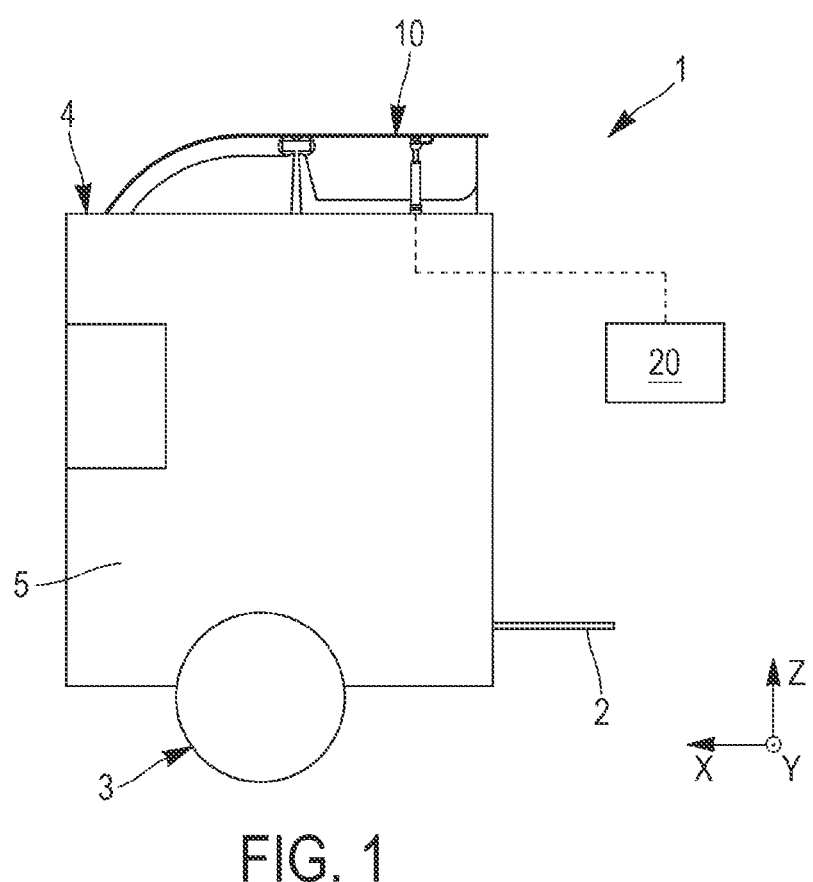
FIG. 1 is a schematic side view of the cab of a vehicle, the cab supporting an air deflector assembly according to an embodiment of the invention.

A vehicle 1, i.e., a truck as illustrated in FIG. 1, comprises a chassis 2 supported by front wheels 3 and rear wheels (not visible). A cab 5 defining a driver's compartment is mounted on the chassis 2, on the front. The chassis 2 can include a trailer connector (not shown) located rearward of the cab 5. The vehicle 1 may thus include a trailer mechanically and electrically connected to the chassis 2, or no trailer connected to the chassis 2, the vehicle 1 thus carrying a load.

Z is defined as the vertical direction, X is defined as the longitudinal direction of the vehicle and Y is defined as the transverse direction of the vehicle.

The vehicle 1 may comprise a controller 20 for controlling the various electric systems of the vehicle 1.

The vehicle 1 also comprises an air deflector assembly 10 for improving aerodynamics. The air deflector assembly 10 is arranged on the roof 4 of the cab 5, and can further comprise two side deflector panels (not shown).

Figure 2:
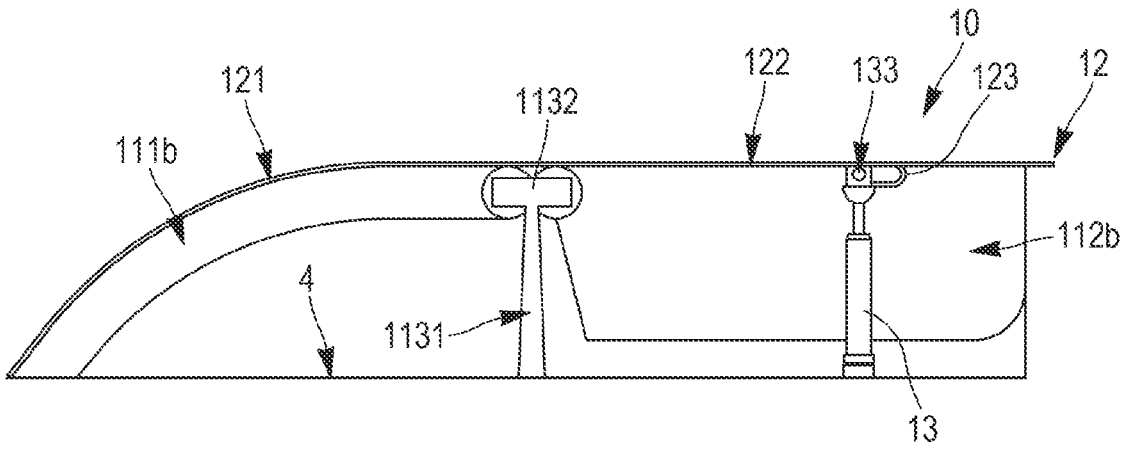
FIG. 2 is a side view of the air deflector assembly supported by the vehicle of FIG. 1.
Figure 3:
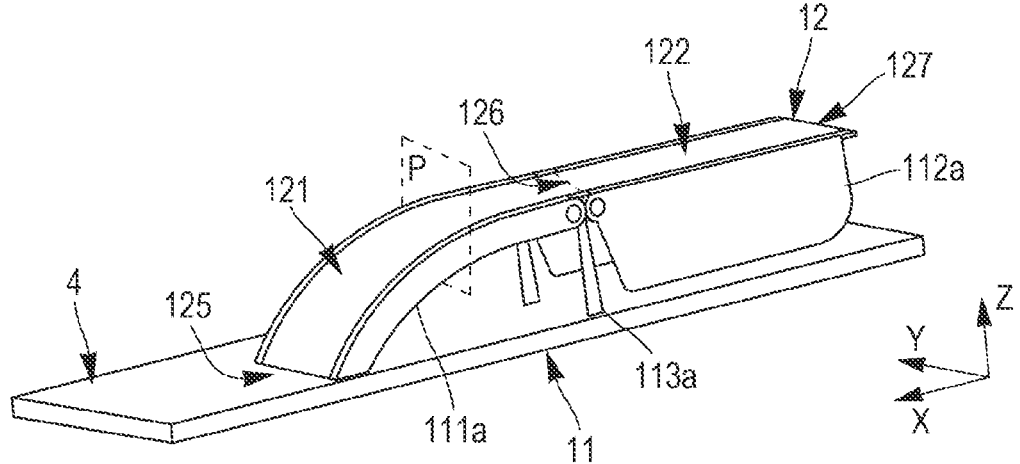
FIG. 3 is a perspective view of the air deflector assembly of FIG. 2.
Figure 4:
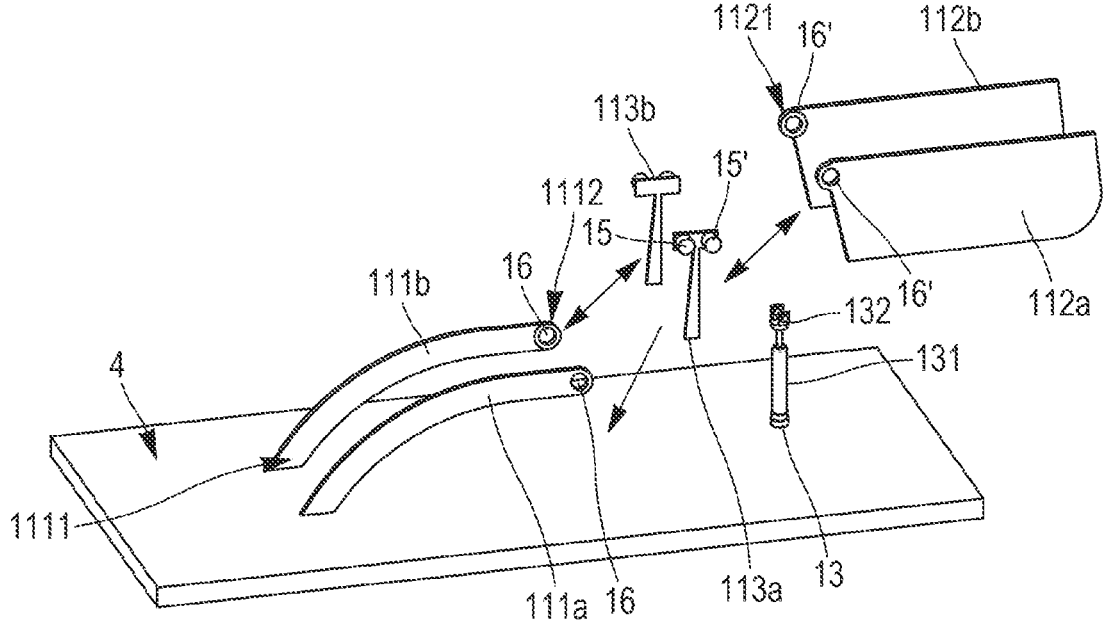
FIG. 4 is an exploded view of the air deflector assembly of FIG. 2 without the deflector panel.

As illustrated in FIGS. 2 to 4, the air deflector assembly 10 comprises a support frame 11 and a deflector panel 12 supported by the support frame 11. The support frame 11 includes a fixed part and a movable part that is hingedly connected to the fixed part. The movable part can thus be inclined relative to the fixed part. Such an inclined position of the movable part of the support frame 11 leads to a temporary deformation of the deformable deflector panel 12. This temporary deformation may advantageously modify the profile of the deflector panel 12 such that it improves the aerodynamics performance of the vehicle 1. The deflector panel 12 may advantageously be formed of a deformable material, such as aluminium for example, and its upper face may advantageously be smooth in order to reduce skin drag.

A rubber sealing may advantageously be provided all around the deflector panel 12 to form a tight sealing under all circumstances.

In the embodiment shown, the fixed part of the support frame 11 includes left and right arc-shaped front panels 111a, 111b that extend in a vertical direction Z and are distant from each other along a lateral direction Y. The left front panel 111a, respectively the right front panel 111b, is fixedly connected to the roof 4 of the cab 5 at a front end 1111 and to a left T-shaped connecting element 113a, respectively to a right T-shaped connecting element 113b, at a rear end 1112. The left connecting element 113a, respectively the right connecting element 113b, comprises a vertical base 1131 and a horizontal crosspiece 1132. The horizontal crosspiece 1132 supports a pair of cylindrical pins, respectively a front pin 15 and a rear pin 15'. The front pin 15 of the left connecting element 113a, respectively of the right connecting element 113b, is received in a through-hole 16 provided in the rear end 1112 of the left front panel 111a, respectively of the right front panel 111b.

The movable part of the support frame 11 includes left and right rectangular rear panels 112a, 112b that extend in a vertical direction Z and are distant from each other along a lateral direction Y. The left rear panel 112a, respectively the right rear panel 112b, is pivotally connected to the left connecting element 113a, respectively to the right connecting element 113b, at a front end 1121 via the rear pin 15' thereof. In particular, the front end 1121 of the left rear panel 112a, respectively of the right rear panel 112b, is provided with a through-hole 16' that is adapted to receive the rear pin 15' of the left connecting element 113a, respectively of the right connecting element 113b.

Figure 6:
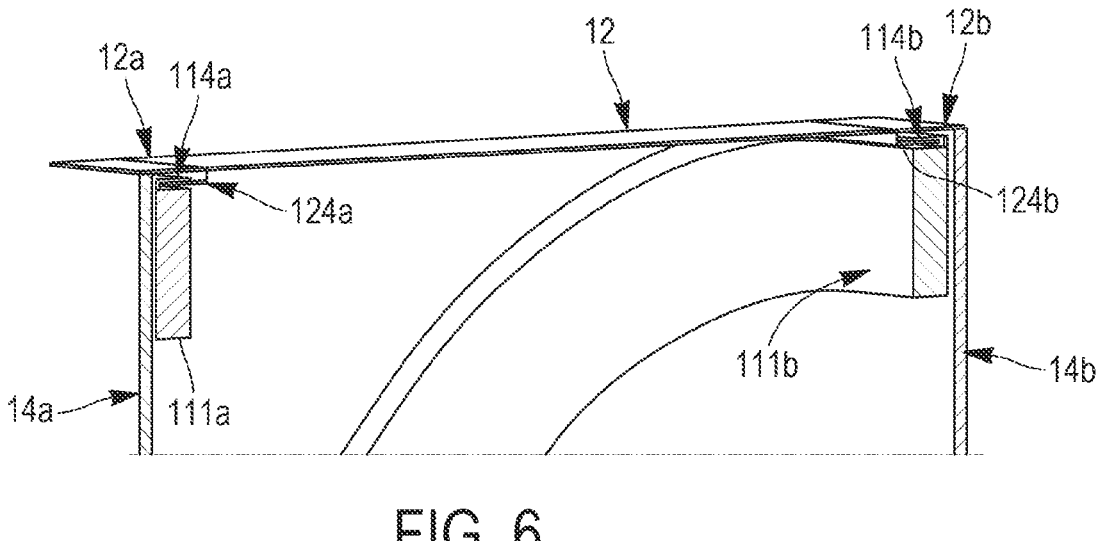
FIG. 6 is a cross-sectional view of the air deflector assembly at the section plane P shown in FIG. 3.

As illustrated in FIG. 6, the upper end of the left front panel 111a, respectively of the right front panel 111b, supports an inversed L-shaped left rail element 114a, respectively an inversed L-shaped right rail element 114b, projecting therefrom. The left rail element 114a, respectively the right rail element 114b, is slidably received in a corresponding groove 124a, respectively 124b, that is provided in the left side 12a, respectively the right side 12b, of the deflector panel 12, thus allowing the sliding connection of the deflector panel 12 to the left and right front panels 111a. 111b. Similar left and right rail elements are also provided in the left and right rear panels 112a. 112b, said rail elements being slidably received in the grooves 124a and 124b respectively, thus allowing the sliding connection of the deflector panel 12 to the left and right rear panels 112a. 112b.

Figure 8:
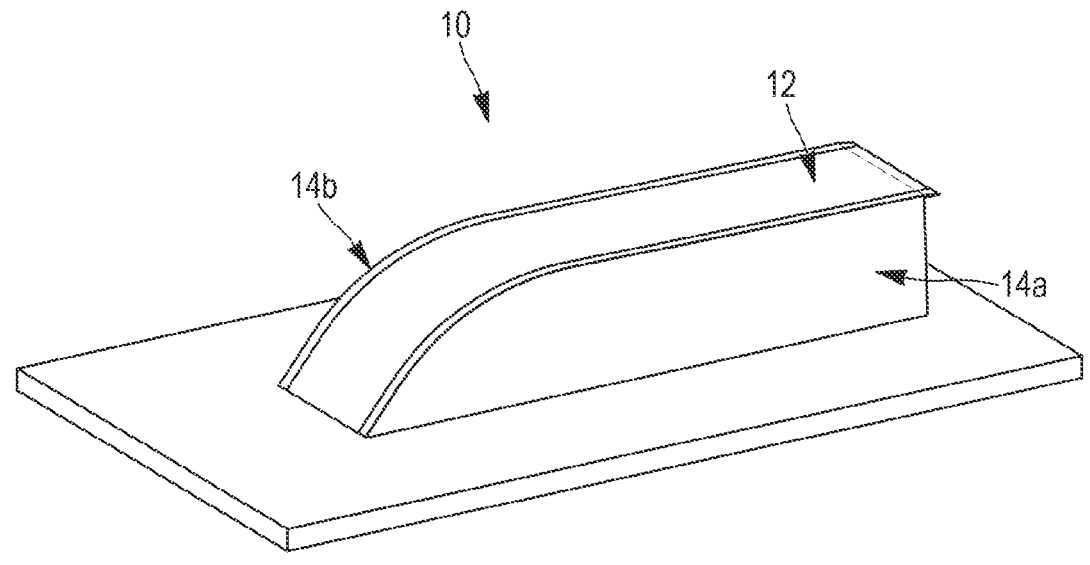
FIG. 8 is a perspective view of the air deflector assembly of FIG. 2 when side deflector panels are mounted at both sides of the support frame.

FIG. 6 also shows that optional side deflector panels 14a. 14b may advantageously be mounted on the left and right front panels 111a, 111b respectively, said side deflector panels 14a, 14b being configured to prevent air to flow under the deflector panel 12, thus improving the aerodynamics performance of the vehicle. The air deflector assembly 10 equipped with said left and right side deflector panels 14a, 14b is illustrated in FIG. 8.

Figure 5:
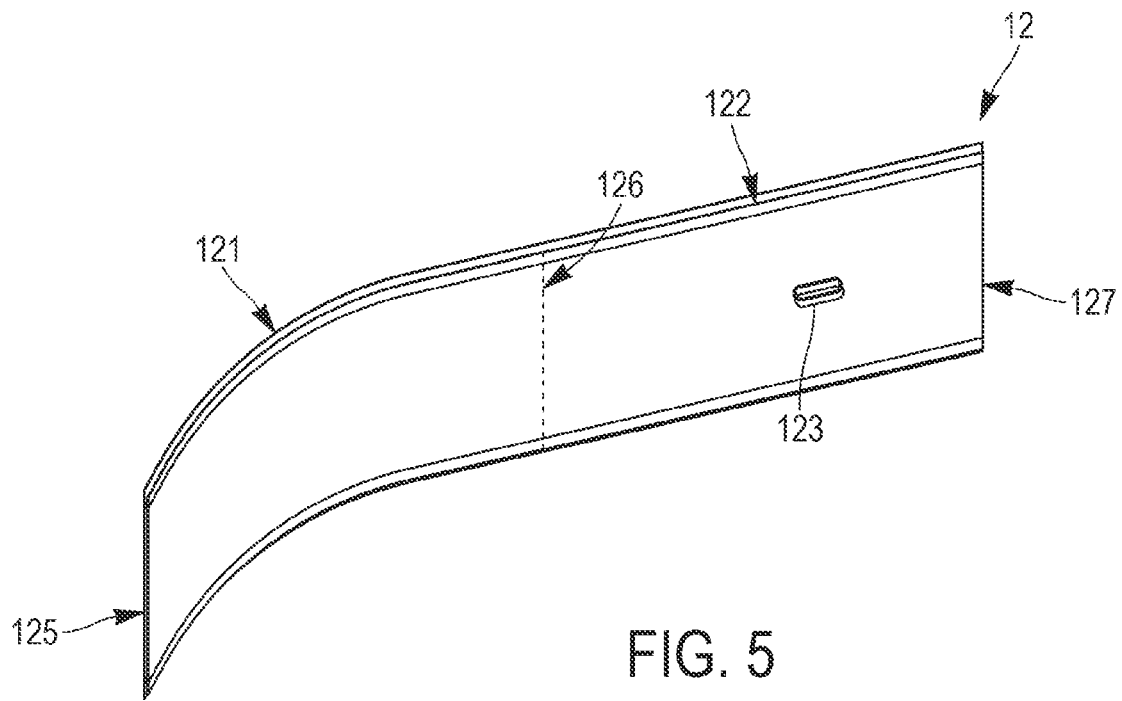
FIG. 5 is a perspective bottom view of the deflector panel of the air deflector assembly of FIG. 2.

The sliding connection of the deflector panel 12 to the support frame 11 leads to the modification of the profile of said deformable deflector panel 12 according to the position of the movable part of the support frame 11. Thus, when the movable part is in a retracted position, as illustrated in FIGS. 2 and 3, the deflector panel 12 has the profile illustrated in FIG. 5. This profile is defined by a curved front portion 121 and a straight rear portion 122. The front portion 121 is supported by the fixed part of the support frame 11 and extends between a front end 125 of the deflector panel 12 and a central line 126 thereof. The front end 125 may advantageously be close to the roof 4, thus limiting the clearance between the roof 4 and the deflector panel 12. The central line 126 is vertically aligned with the vertical bases 1131 of the left and right connecting elements 113*a*, 113*b*, as illustrated in FIG. 3. The rear portion 122 is supported by the movable part of the support frame 11 and extends along a longitudinal direction X between the central line 126 of the deflector panel 12 and a rear end 127 thereof.

Figure 7:
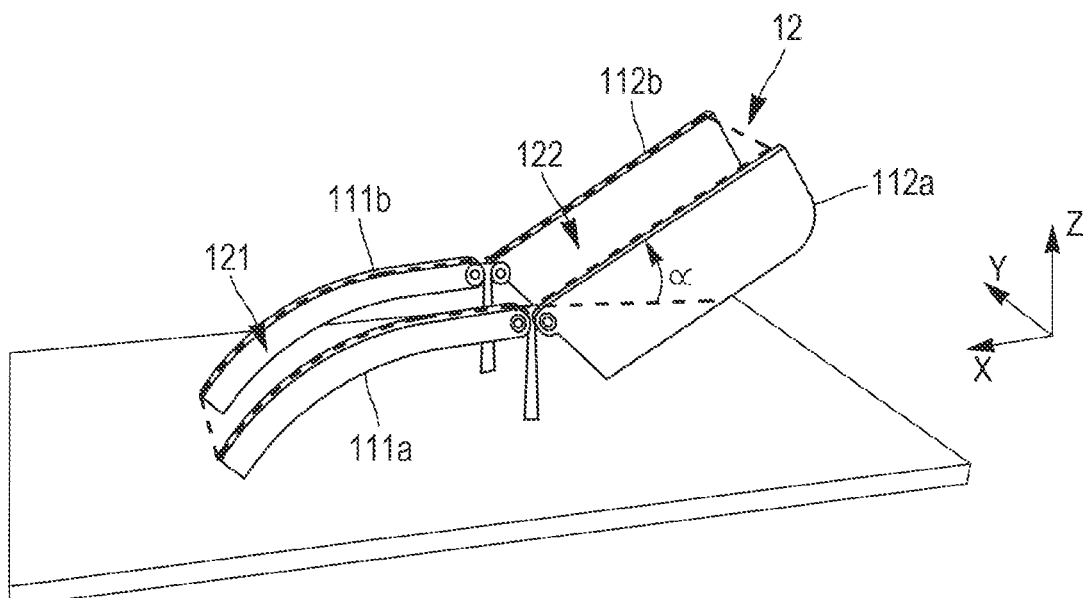
FIG. 7 is a perspective view of the support frame of the air deflector assembly of FIG. 2, in one selected inclined position thereof.

When the movable part of the support frame 11 pivots from its retracted position to an inclined position, illustrated in FIG. 7, in which the left and right rear panels 112*a*, 112*b* define an angle α with the longitudinal direction X. In said inclined position, the rear portion 122 of the deflector panel 12 (illustrated in dotted lines) is inclined relative to the roof 4, the front portion 121 of the deflector panel 12 having the same position as illustrated in FIGS. 2 and 3. This inclined position of the movable part thus leads to a modification of the profile of the deflector panel 12. In particular, the deflector panel 12 is bent at the central line 126. This specific profile of the deflector panel 12 may be selectively chosen depending on various parameters related to the vehicle (i.e., its speed), the trailer or the load (i.e., its height) or the environment (i.e., the wind direction and the wind force).

The air deflector assembly 10 includes a positioning device that is adapted to modify the position of the movable part of the support frame 11. In the embodiment shown, this positioning device consists in a linear actuator 13 that vertically projects from the roof 4. This linear actuator 13 may be powered by an electric or hydraulic or pneumatic energy source. The linear actuator 13 comprises a cylinder 131 and a rod 132 that can move vertically relative to the cylinder 131. The rod 132 is provided at its upper end with an actuating pin 133 that is slidably received in an annular housing 123 protruding from the lower face of the deflector panel 12. Therefore, when the rod 132 is raised, the actuating pin 133 pushes the deflector panel 12 upward, which acts on the left and right rear panels 112*a*, 112*b* such that their position changes relative to the one of the left and right front panels 111*a*, 111*b*.

The controller 20 may control the linear actuator 13. Thus, when the driver aims to modify the position of the deflector panel 12, it has to actuate a switch on the dashboard of the vehicle. The actuation of the switch is detected by the controller 20, which initiates the linear actuator 13 to raise. The linear actuator 13 can be stop at any position in between within the range of the linear actuator.

It is to be understood that the present invention is not limited to the embodiments described above and illustrated in the drawings; rather, the skilled person will recognize that many changes and modifications may be made within the scope of the appended claims.

The invention claimed is:

1. An air deflector assembly for a motor vehicle, comprising:

a support frame configured to be attached to a roof of a motor vehicle, the support frame having a fixed part and a movable part, the movable part being hingedly connected to the fixed part;

a positioning device permitting to the movable part to be moved between a retracted position and a selected one of several inclined positions; and a deflector panel supported by and conforming to the fixed part and the movable part of the support frame;

wherein the deflector panel is deformable such that its profile changes when the movable part moves from its retracted position to its selected inclined position.

2. The air deflector assembly of claim 1, wherein the deflector panel comprises a front portion that is supported by the fixed part of the support frame and a rear portion that is supported by the movable part of the support frame.

3. The air deflector assembly of claim 2, wherein the positioning device consists in a linear actuator that is adapted to move the movable part of the support frame relative to the fixed part thereof.

4. The air deflector assembly of claim 2, wherein the fixed part and, respectively, the movable part, of the support frame each comprise a left panel and a right panel, the left and right panels extending in a vertical direction and being distant from each other along a lateral direction.

5. The air deflector assembly of claim 4, wherein the left panels of the fixed and movable parts and, respectively, the right panels of the fixed and movable parts, are pivotally connected to a left connecting element, respectively to a right connecting element.

6. The air deflector assembly of claim 5, wherein the left connecting element and, respectively, the right connecting element, comprise a pair of cylindrical pins and, respectively, a front pin about which is connected the left panel and, respectively, the right panel, of the fixed part and a rear pin about which is pivotally connected the left panel and, respectively, the right panel, of the movable part.

7. The air deflector assembly of claim 6, wherein the left and right panels of the fixed and movable parts are each provided with a through-hole that is adapted to receive one of the front and right pins of the left and right connecting elements.

8. The air deflector assembly of claim 4, wherein the deflector panel comprises a left side and, respectively, a right side, which is slidably connected to the left panels and, respectively, the right panels, of the fixed and movable parts.

9. The air deflector assembly of claim 8, wherein the left side and, respectively, the right side, of the deflector panel is provided with a groove that is adapted to slidably receive inversed L-shaped rail elements projecting from an upper end of the left panels and, respectively, the right panels, of the fixed and movable parts respectively.

10. A vehicle comprising the air deflector assembly of claim 1.

*    *    *    *    *